United States Patent [19]

Zievers

[11] 4,180,459
[45] Dec. 25, 1979

[54] PROCESS OF MAKING AGRICULTURAL PRODUCT FROM ORGANIC SEWAGE SLUDGE

[75] Inventor: James F. Zievers, LaGrange, Ill.

[73] Assignee: Industrial Filter & Pump Mfg. Co., Cicero, Ill.

[21] Appl. No.: 861,292

[22] Filed: Dec. 16, 1977

[51] Int. Cl.$^2$ .......................... C02C 1/02; B01D 5/00; C05F 3/00
[52] U.S. Cl. .......................................... 210/10; 71/12; 71/DIG. 2; 210/53; 71/26
[58] Field of Search ................. 210/59, 10, 52, 53; 71/12, 26, 11, 25, 27, DIG. 2, 64 JC

[56] References Cited

U.S. PATENT DOCUMENTS

| | | | |
|---|---|---|---|
| 1,915,240 | 6/1933 | Putnam | 71/12 |
| 2,264,790 | 12/1941 | Coleman | 71/12 |

FOREIGN PATENT DOCUMENTS 7504763 10/1976 Netherlands .............................. 71/12

OTHER PUBLICATIONS

Tenney et al., *JWPCF*, 42R1-1970, pp. R5-R10.
Rudolfs, W., *Principles of Sewage Treatment*, National Lime Assoc., D. C., 1956, pp. 56-63.
Weber, W. J., *Physiochemical Processes*, Wiley, New York, 1973, pp. 80-81.
Powell, Sheppard, *Industrial & Eng. Chemistry*, Nov. 1954, vol. 46, No. 11, pp. 85a-86a.

*Primary Examiner*—Joseph Scovronek
*Assistant Examiner*—Chris Konkol
*Attorney, Agent, or Firm*—Edmond T. Patnaude

[57] ABSTRACT

An acidic organic agricultural product is made by conditioning organic sewage sludge with amounts of $FeCl_3$ and sugar factory waste lime to provide an acidic conditioned sludge, of pH greater than 3.0 but less than 5.7 and then mechanically dewatering the conditioned sludge.

7 Claims, No Drawings

PROCESS OF MAKING AGRICULTURAL PRODUCT FROM ORGANIC SEWAGE SLUDGE

The present invention relates in general to the art of dewatering organic sewage sludge by conditioning the sludge prior to the dewatering thereof by mechanical means such as filtration and it further relates to a new and improved process for making an agricultural product from organic sewage sludge, as well as relating to the agricultural product itself.

BACKGROUND OF THE INVENTION

In order to enable the efficient dewatering of organic sewage sludge by mechanical means such as filtration or centrifugation, it is the usual practice to add flocculating agents to the sludge prior to dewatering. The most commonly accepted conditioning method is to mix ferric chloride with the sludge and thereafter to mix virgin or slaked lime to the sludge mixture. The amount of ferric chloride which is generally used lowers the pH of the sludge to about 3.0 or less and the subsequent addition of lime raises the pH to a value in the range of about 10.5 to 11.5. While this well known process permits the dewatering of the sludge in a reasonably short time, it has several disadvantages.

One of the more important disadvantages of this widely used conditioning process is the fact that the resulting dewatered sludge has little if any commercial value and must be handled as a waste product. Moreover, the conditioning agents themselves when added to the sludge increase the weight of the dry solids in the sludge by a factor of about twenty percent. This added weight and bulk in turn increases the disposal cost. In addition, however, since the sludge and the removed solids have a very high alkalinity the cost of disposing of these solids is disproportionately greater. Also, the high alkalinity of the conditioned sludge necessitates frequent cleaning and descaling of the mechanical dewatering equipment used in the overall process.

Published studies describe test work involving conditioned sludges having pH values as low as 8.0 to 7.0 but there are no reports of studies conducted with sludges having lesser pH values. See for example, Tenny et al—"Chemical Conditioning of Biological Sludges for Vacuum Filtration" at 42R1-1970 of the *Journal Water Pollution Control Federation*. These studies indicate that filtration times of the conditioned sludges increase appreciably as the pH decreases below a pH of 7.

SUMMARY OF THE INVENTION

Briefly in accordance with one aspect of the present invention sewage sludge is treated with amounts of $FeCl_3$ and $CaO$ to provide a conditioned sludge having a pH below 5 and characterized by good filterability characteristics as compared to conditioned sludge having a pH of 9 and over. This is accomplished by substantially decreasing the amount of CaO added to the sludge after the addition of the $FeCl_3$.

In accordance with another aspect of the invention the lime is added to the sludge in the form of the waste lime by-product from sugar refining processes. At the present time this waste lime is of no value and is discarded as a waste product from the refineries. Either waste factory lime from the processing of beet sugar or waste carbonitation lime from the processing of cane sugar can be used in the process of the present invention.

In accordance with a further aspect of this invention, an agricultural product is made from sewage sludge by the treatment thereof with $FeCl_3$ and lime in proper amounts to render the sludge filterable and at a pH of below 5. The conditioned sludge is thereafter dewatered by means of filters or other mechanical dewatering means to provide a relatively dry organic product having a pH of less than 5 and suitable for agricultrual purposes such as fertilizing and mulching. As used herein the term "lime" includes factory waste lime as well as other forms of calcium carbonate.

Not only does this novel conditioning process result in a dewatered sludge having good agricultural uses, but the heretofore waste products from sugar refineries are substituted for the relatively expensive slaked quick lime. The process of the present invention thus uses what has heretofore been a costly waste product of sugar refineries to convert the dewatered sludge from sewage treatment plants from a troublesome waste product to a valuable by-product.

DETAILED DESCRIPTION OF THE INVENTION

The most commonly used flocculating agent for conditioning organic sewage sludge prior to mechanical dewatering by filtration is ferric chloride used in association with virgin lime ($C_aO$) or slaked lime $C_a(OH)_2$. Inasmuch as sewage sludges vary widely in composition and physical characteristics, in accordance with the prior art teachings the required dosages of the $FeCl_3$ and $C_a(OH)_2$ vary within relatively wide ranges. Typically, however, the dosages have ranged from four to eight percent $FeCl_3$ and nine to eighteen percent $C_a(OH)_2$ by weight of dry weight substance in the sludge. Degremont provides a graph from which the required dosage of $FeCl_3$ can be calculated on the basis of the alkalinity and volatile matter content of the sludge on page 425 of his *Water Treatment Handbook*.

In order to demonstrate the process of the present invention a series of bench tests were conducted on one-hundred milliliter samples of typical municipal aerobic organic sewage sludge having an average of about 1.35 percent dry substance and sixty percent volatile matter. The activated sludge had a pH of 6.7. Different dosages of a 12% solution of waste lime following the treatment of the sludge with a 15% solution of ferric chloride were used to condition the sludge. After each dosage the pH of the conditioned sludge was measured, and the conditioned sludge was then dewatered by filtering it through a Buchner funnel dressed with two sheets of Whatman #3 filter paper. The times required to effect a removal of between eighty and ninety percent of the water from the sludge was measured and recorded. Table I is a tabulation of the results achieved by the use of waste lime in a ferric chloride conditioning process wherein activated sewage sludge from the Hinsdale sewage treatment plant in Hinsdale, Ill. was conditioned and subsequently dewatered using the said filtration process.

TABLE I

| Volume of Sludge Treated | 15% Solution FeCl₃ | pH After FeCl₃ Treatment | 12% Solution Waste Lime | pH After Lime Treatment | Total Resultant Volume | Time to Remove Liquid 25 ml | Time to Remove Liquid 50 ml | Total ml Removed | Total Time |
|---|---|---|---|---|---|---|---|---|---|
| 100ml | 2.5ml | 2.5 | 21 ml | 5.5 | 120ml | 0'25" | 1'15" | 95 | 4'55" |
| 100ml | 2.5ml. | 2.5 | 14 ml | 5.5 | 115ml | 0'27" | 1'30" | 89 | 5'20" |
| 100ml | 2.5ml | 2.5 | 7 ml | 5.0 | 108ml | 0'25" | 1'24" | 83 | 4'51" |
| 100ml | 2.5ml | 2.5 | 3.5 ml | 4.4 | 100ml | 0'23" | 1'18" | 80 | 4'40" |
| 100ml | 2.5ml | 2.5 | 1.5 ml | 3.7 | 100ml | 0'20" | 1'13" | 78 | 3'32" |
| 100ml | 2.5ml | 2.5 | 1.25 ml | 3.1 | 100ml | 0'30" | 1'35" | 75 | 3'46" |
| 100ml | 2.5ml | 2.5 | 0.75 ml | 2.8 | 100ml | 0'32" | 1'41" | 79 | 4'37" |

From the test results set forth in Table I it may be seen that the flow rate of the conditioned sludge increases as the dosage of waste lime decreases from twenty-one milliliters to one and one-half milliliters. However, the acidity of the sludge increases inversely with the dosage of waste lime wherefor the desire for maximum flow rate and for a relatively neutral pH sludge must be compromised so that in some cases the dosage of lime is adjusted to provide a less acidic sludge even though the flow rate is not optimized. Also, although the dosage of FeCl₃ used reduced the pH of the sludge to 2.5, this is not critical and lesser amounts of FeCl₃ may be used in the process of the present invention. However, the pH of the sludge should be reduced to about 3 or less prior to addition of the lime for economically satisfactory flow rates during filtration.

Since factory waste lime is primarily calcium carbonate, a second series of tests were conducted using ferric chloride and substantially pure calcium carbonate as the floculating agents for activated sewage sludge from the same Hinsdale plant. The results of these test are illustrated in Table II.

carbonate other than sugar factory waste lime can be used with ferric chloride for conditioning organic sewage sludge to provide a dewatered filter cake having a sufficiently low pH for good agricultural use.

In order to demonstrate the effectiveness of cane carbonitation sugar factory lime in combination with ferric chloride as an organic sludge conditioner, a series of tests were conducted using varying amounts of this type of waste lime. The results of these tests are tabulated in Table III.

TABLE III

| Volume of Sludge Treated | 15% Solution FeCl₃ | pH After FeCl₃ Treatment | 12% Solution Waste Lime | pH After Lime Treatment | Total Resultant Volume | Time to Remove Liquid 25 ml | Time to Remove Liquid 50 ml | Total ml Removed | Total Time |
|---|---|---|---|---|---|---|---|---|---|
| 100ml | 2.5ml | 2.7 | 21.0ml | 5.5 | 120ml | 0'-37" | 2'-40" | 91 | 11'-11" |
| 100ml | 2.5ml | 2.7 | 14.0ml | 5.7 | 120ml | 0'-47" | 2'-56" | 98 | 11'-55" |
| 100ml | 2.5ml | 2.4 | 7.0ml | 5.0 | 108ml | 0'-44" | 2'-33" | 82 | 10'-33" |
| 100ml | 2.5ml | 2.4 | 3.5ml | 4.5 | 108ml | 0'-30" | 1'-54" | 77 | 6'-30" |
| 100ml | 2.5ml | 2.4 | 1.5ml | 3.7 | 103ml | 0'-24" | 1'-30" | 71 | 3'-45" |
| 100ml | 0 | 6.6 | 0 | 6.6 | 100ml | 8'-23" | | | |
| 100ml | 2.5ml | 2.4 | 0 | — | 100ml | 0'-20" | 1-40" | 66 | 3'-10" |

Similar tests were conducted using sewage sludges from geographically different municipalities, namely Naples, Fla. and Largo, Fla. The results of the second series of tests also demonstrated that filterability of the conditioned sludges is improved as the pH level is decreased below about 7.0. Inasmuch as problems of corrosion and the like increase markedly as the acidity increases below a pH of about 3.0, it appears that the pH of the conditioned sludge should be in the range of about 3.0 to 5.5 with the optimum value being in the range of about 3.5 to 4.5. These tests also confirm the fact that sugar factory waste lime from either beet or

TABLE II

| Volume of Sludge Treated | 15% Solution FeCl₃ | pH After FeCl₃ Treatment | 12% Solution CaCo₃ | pH After Lime Treatment | Total Resultant Volume | Time to Remove Liquid 25 ml | Time to Remove Liquid 50 ml | Total ml Removed | Total Time |
|---|---|---|---|---|---|---|---|---|---|
| 100ml | — | 6.8 | — | 6.8 | 100ml | 7'08" | | | |
| 100ml | 2.5ml | 2.5 | — | 2.5 | 100ml | 0'-33" | 2'02 | 78 | 6'10" |
| 100ml | 2.5ml | 2.5 | 21 | 5.2 | 120ml | 0'-19" | 0'57" | 96 | 3'43" |
| 100ml | 2.5ml | 2.5 | 14 | 5.0 | 115ml | 0'-22" | 1'05" | 88 | 3'49" |
| 100ml | 2.5ml | 2.5 | 7 | 4.5 | 105ml | 0'-21" | 1'07" | 81 | 4'50" |
| 100ml | 2.5ml | 2.5 | 3.5 | 3.4 | 102ml | 0'-20" | 1'10" | 82 | 4'45" |
| 100ml | 2.5ml | 2.5 | 1.5 | 3.3 | 100ml | 0'-23" | 1'11" | 79 | 3'50" |
| 100ml | 2.5ml | 2.5 | 1.0 | 2.9 | 100ml | 0'25" | 1'24" | 78 | 4'27" |

A comparison of Tables I and II shows that the dewatered sludge resulting from sludge conditioned with factory waste lime is very similar to the conditioned sludge resulting from conditioning sewage sludge with pure calcium carbonate. Moreover, the flow rates during filtration of the sludge treated with pure CaCO₃ were substantially the same as the flow rates obtained with sludge conditioned with beet factory waste lime. Consequently, it is apparent that sources of calcium cane refineries is a satisfactory conditioning agent when used in conjunction with FeCl₃.

It may thus be seen that the process of the present invention enables a substantial reduction in the weight of the conditioned sludge as compared to "classically" conditioned sludge. Moreover, the dewatered sludge may be used as an agricultural product such for example, as a mulch or fertilizer. In addition, waste lime from sugar beet and sugar cane refining processes may be used as one of the conditioning agents.

What is claimed:

1. A process for dewatering organic sewage sludge to provide an acidic dewatered sludge, comprising the steps of
   (a) adding ferric chloride to the organic sludge to lower the pH thereof to about 3.5 or less,
   (b) then adding an amount of calcium carbonate to said organic sludge to increase the pH level thereof to a value greater than 3.5 but less than 5.7, and
   (c) then dewatering said organic sludge by a mechanical dewatering process,
whereby the resulting dewatered sludge has a pH less than 5.7.

2. A process according to claim 1, wherein
said calcium carbonate is added to said sludge in the form of waste sugar factory lime.

3. A process according to claim 1 wherein the amount of calcium carbonate added to the sludge is sufficient to raise the pH of the conditioned sludge to a value in the range of 3.5 to 5.5.

4. A process according to claim 1 wherein the amount of calcium carbonate added to the sludge is sufficient to raise the pH of the conditioned sludge to a value in the range of about 4.0 to 4.5.

5. A process according to claim 3 wherein said calcium carbonate is added to said sludge by mixing waste sugar factory lime with said sludge.

6. A process according to claim 5 wherein said waste lime is carbonitation waste lime.

7. A process for dewatering organic sewage sludge to provide an acidic dewatered sludge suitable for agricultural uses, comprising the steps of
   (a) mixing with said sludge an amount of ferric chloride sufficient to lower the pH of said sludge to about 3 or less,
   (b) mixing with said sludge an amount of calcium carbonate sufficient to cause the conditioned sludge to have a pH greater than 3 and less than 5.7, and then
   (c) dewatering the conditioned sludge by a mechanical dewatering process,
whereby the resulting dewatered sludge has a pH less than 5.7 and may be used for agricultural purposes.

* * * * *